(12) United States Patent
Mock et al.

(10) Patent No.: US 6,768,245 B2
(45) Date of Patent: Jul. 27, 2004

(54) PIEZOELECTRIC DRIVE (75) Inventors: Elmar Mock, Salvan (CH); Bontko Witteveen, JB Venlo (NL)

(73) Assignee: Creaholic SA, Biel (CH)

( * ) Notice: Subject to any disclaimer, the term of this patent is extended or adjusted under 35 U.S.C. 154(b) by 0 days.

(21) Appl. No.: 10/130,976

(22) PCT Filed: Nov. 29, 2000

(86) PCT No.: PCT/CH00/00636
§ 371 (c)(1),
(2), (4) Date: Aug. 7, 2002

(87) PCT Pub. No.: WO01/41228
PCT Pub. Date: Jun. 7, 2001

(65) Prior Publication Data
US 2003/0052575 A1 Mar. 20, 2003

(30) Foreign Application Priority Data
Nov. 29, 1999 (CH) ............ 2178/99
May 24, 2000 (CH) ............ 1041/00

(51) Int. Cl.⁷ ............ H01L 41/08
(52) U.S. Cl. ............ 310/323.02
(58) Field of Search ............ 310/323.02, 323.12, 310/323.16, 328

(56) References Cited
U.S. PATENT DOCUMENTS

| | | | | |
|---|---|---|---|---|
| 4,453,103 A | * | 6/1984 | Vishnevsky et al. | 310/323.02 |
| 4,831,306 A | * | 5/1989 | Staufenberg et al. | 310/328 |
| 4,959,580 A | * | 9/1990 | Vishnevsky et al. | 310/323.02 |
| 5,087,851 A | * | 2/1992 | Nakazawa et al. | 310/323.16 |
| 5,134,334 A | * | 7/1992 | Onishi et al. | 310/323.16 |
| 5,146,129 A | * | 9/1992 | Tamura et al. | 310/323.16 |
| 5,191,688 A | * | 3/1993 | Takizawa et al. | 29/25.35 |
| 5,200,665 A | * | 4/1993 | Iijima | 310/323.16 |
| 5,216,313 A | * | 6/1993 | Ohinishi et al. | 310/323.16 |
| 5,561,337 A | * | 10/1996 | Toda | 310/323.02 |
| 6,064,140 A | * | 5/2000 | Zumeris | 310/323.02 |
| 6,188,161 B1 | * | 2/2001 | Yoshida et al. | 310/328 |
| 6,242,846 B1 | * | 6/2001 | Ashizawa et al. | 310/323.02 |
| 6,323,578 B1 | * | 11/2001 | Suzuki et al. | 310/323.02 |

FOREIGN PATENT DOCUMENTS

DE 39 20 726 A1 1/1990
EP 0 505 848 A1 3/1992

* cited by examiner

Primary Examiner—Mark Budd
(74) Attorney, Agent, or Firm—Rankin, Hill, Porter & Clark LLP

(57) ABSTRACT

A piezoelectric drive having an excitation piezoelement (10) and a resonator (2). The resonator is coupled to the piezo-element and is in interactive connection with a body (3) to be driven. The resonator (2) has a mass distribution that is designed such that, as a result of an excitation oscillation by the piezoelement (10), the resonator (2) begins to asymmetrically oscillate in several directions dependent on the frequency of the excitation oscillation. The asymmetric oscillations, via the interactive connection, displace the body to be driven into a directed movement.

19 Claims, 6 Drawing Sheets

PIEZOELECTRIC DRIVE

BACKGROUND OF THE INVENTION

1. Field of the Invention

The present invention relates to piezoelectric drives, to piezoelectric resonators for drives and to the use of piezoelectric drives as well as to piezoelectric resonators.

2. Description of Related Art

Certain, so-called piezoelectric materials may be excited into mechanical oscillation by applying an electrical alternating current. This physical effect is also called the reverse piezoelectrical effect. A known use of this effect is the use of piezoelectric materials as oscillation exciters in resonators. Such piezoelectric resonators may be installed into drives in order to drive rotatably mounted rotors.

The drives that are known in the art and that are based on the piezoelectric effect have severe disadvantages, which until today have prevented a widespread industrial use as drives. A complex actuation of the piezoelectric oscillation elements, a large danger of contamination, very small mechanical tolerances that prevent a trouble-free operation and a poor efficiency are the most severe disadvantages. Furthermore, with the solutions known today only very low rotational speeds with an extremely small torque are possible. A reduction in size of these drives so that they may be used, for example, in micro-technology or medical technology or also in the field of clocks is possible only at a great expense, rendering economical manufacture impossible. The large mechanical abrasion of the known arrangements further demand the use of particularly hard, and therefore expensive, materials that are difficult to machine. Only a small amount of abrasion causes an increase of the play and a contamination of the drive, which inevitably leads to a failure after a short operational duration.

Such piezoelectric drives are, for example, disclosed in the documents EP-0,505,848 (hereinafter referred to as EP'848), EP-0,723,213 (hereinafter referred to as EP'213) and FR-2,277,458 (hereinafter referred to as FR'458) as well as the document equivalent to this DE 25 30 045 (hereinafter referred to as DE'045).

EP'848 and EP'213 show multi-part centrally arranged piezoelectric resonators with two or three resonator wings. The ends of the resonator wings have abutments for abutting rotors, which are arranged annularly on the outside around the resonators. With these piezoelectric drives there is the disadvantage of the abrasion at the abutment surfaces of the resonator wings and at the capture surfaces of the rotors as well as the bearing play of the rotors. The abrasion results in a high wear, which shortens the life duration of the piezoelectric drives and limits its potential field of application.

DE'045 (corresponding to FR'458) describes the most varied of arrangements of electrical motors that are based on piezoelectric elements. These motors have a stator and a rotor, wherein at least one or both has a vibrator that encloses a piezoelement. The stator and the rotor are pressed against one another at a point of the surface that lies on the surface of the vibrator by way of an elastic element in order to transmit a moment. A direction change is effected by way of a reversal means, which functions to the extent that several vibrators are alternately applied. In DE'045 it is mentioned that with these motors with a resonator it is impossible to change the rotational direction. A change of the rotational direction demands two vibrators (for example rotor and stator active). Furthermore, the abutments perpendicular to the contact surface between the rotor and the stator are disadvantageous. It is mentioned that the wear with the motors is very large, in particular with several rotational directions. A reversal of the rotational direction is only achieved at a great expense. On account of the parts, which are very difficult to manufacture, a suitable design is very expensive.

SUMMARY OF THE INVENTION

It is therefore an object of the present invention to provide a piezoelectric drive that has a low wear, is inexpensive, and is manufacturable in any size, particularly small and flat. The drive is to be robust in operation, simple in maintenance and large in power. It is to have a large rotational speed range in several rotational directions and, furthermore, permit a simple position determination. This piezoelectric drive is to be compatible with common standards.

Piezoelectric drives are, as a rule, based on resonators that are set into oscillation. These are, in turn, transmitted to a body to be driven. The present invention is based on the recognition that the oscillation behavior of a piezoelectrically excited resonator may be influenced in the longitudinal direction as well as the transverse direction by way of a targeted design and arrangement. A piezoelectrically driven resonator operated in a mix mode by way of the design of the present invention permits a body to be set into motion. According to the shaping of the resonator and the arrangement of one or more resonators to a body, a variety of structural embodiments and uses become possible. By way of the special design, several dominant oscillation forms may be excited. By way of the special design, it is possible to select the. oscillation forms such that the rotational direction amongst other things may be selected dependent on the frequency. An influencing of the rotational speed is advantageously effected by way of the magnitude of the amplitude. Due to the inventive shaping of the resonator, it is further possible to minimize damaging vibrations that cause wear. By way of a directed arrangement it is achieved that abrasion does not have a negative effect and is compensated. The piezoelectric drive may be used for the unidirectional or bi-directional drive of bodies, such as shafts and disks, with only one piezoelement. In contrast to this, the state of the art arrangements as a rule require several oscillation quartzes, which must be exactly coordinated to one another.

In an advantageous solution a longitudinal oscillation component of the piezoelectric resonator serves for driving a body while a transverse oscillation component of the resonator exerts a temporary pressure on the body. By way of the thus created pressure angle large forces may be transmitted onto the body to be driven. The drive, when required, has a great self-locking so that, among other things, the body is held. An additional mounting of the parts to be moved may be avoided in a directed manner.

The piezoelectric drive according to the invention comprises an excitation element and a resonator that is coupled to the excitation element and in interactive connection with a body to be driven. The excitation element is advantageously mounted between two parts of the resonator and acts indirectly on the body to be driven. The movement induced by the excitation element is transformed by the resonator and then transmitted to the body to be driven. The resonator has a mass distribution, which is configured such that, as a result of an excitation oscillation by way of the excitation element, dependent on the frequency of the excitation oscillation, the resonator begins to oscillate asymmetrically in several directions. These oscillations, via an interactive connection, are transmitted onto the body to be driven via the interactive connection so that this is set into a directed movement. The mass inertia of the oscillating elements is exploited in a directed manner in order to produce advantageous oscillation forms, By way of the arrangement and design it is achieved that the excited forms of movement achieve an optimized drive with a minimal of wear and material loading. By way of adjustable elements it is achieved that any occurring incidences of wear are compensated and equalized. The resonators are advantageously excited with a frequency that corresponds to frequency of resonance or of a multiple thereof. A resonator as a rule comprises severally differently and asymmetrically formed arms that, depending on the frequency of excitation, oscillate differently. These are also influenced by way of the material choice and the mass distribution.

The movement form of the resonators is selected such that one achieves high resonance frequencies and, thus, large rotational speeds. In contrast to the state of the art, the drive according to the invention functions at very high frequencies and the piezoelements may also be selected small. The resonators are constructed so that they permit modes of oscillation. The drive according to the invention is very robust and has large cooling surfaces. A negative, perpendicular abutting of the piezoelements onto the surface of the part to be driven is avoided in a directed manner, in particular before the drive begins to act. The mass and its distribution of the resonator and its pressing force play an important part. In order to achieve a high efficiency and a large torque it is important for the driving elements to carry out as much work as possible during the time.

In a preferred arrangement, the drive has a single piezoelectric resonator with which one drives bi-directionally. This, among other things, permits a simple activation of the resonator and piezoelectric drive over a single oscillation with the same frequency and phase. For example, in order to realize a particularly small drive it is possible to integrate the piezoelectric element, which is responsible for the mechanical excitation, into the oscillation circuit as an active element. By way of this structure, together with a drive for a clock, one would be able to do away with additional oscillation quartzes. Corresponding arrangements are also particularly advantageous in medical technology.

A ratio of the length to the width of the exciter, in the piezoelectrically driven resonator, equal to two or a multiple thereof, is particularly favorable. The body to be driven is driven with a maximum amplitude, which results in an optimal efficiency of the drive.

The piezoelectric drive, when required, is provided with positioning means, which are formed such that they create a signal that may be externally measured. For example, by way of an alternating pressing force of the piezoelectric drive one may achieve changes in impedance that are measurable and countable. Thus, a position detection of the body is possible which, for example, permits the use of the drive as a stepper motor. Also, in clocks a corresponding positioning aid may be useful, e.g. for setting the hands to zero.

The resonator and the excitation element by way of an elastic means are advantageously mounted elastically with respect to the body to be driven. The elastic mounting compensates for malfunctions occurring on driving the body and, among other things, leads to a very smooth running on the drive. Also any wear occurring by way of abrasion on the drive surfaces and capture surfaces is compensated. The elastic means may, for example, be designed as a spring. By way of material selection and arrangement one may influence the spring and/or damping behavior. Advantageously, the elastic means may, at least in one direction, have a smaller elasticity than the interactively connected resonator. The elastic means is, in particular, designed such that it does not unintentionally transmit movements (oscillations). The elastic element and the resonator may also be designed as one piece and be of the same material. Therefore, the function of the elastic element and resonator is then defined by shaping and arrangement. The elastic means may be one piece or several pieces. For example, springs of metal or plastic elements that are manufactured, for example, by injection molding are suitable.

The piezoelectric drive may be designed very flat and be used as a rotation or linear motor. The most varied of applications are possible. Exemplary fields of application are clocks, cameras, data memories, microscope tables, tachos, etc.

The resonators, which as a rule are driven by way of piezoelectric elements, may, for example, be particularly advantageously manufactured by way of injection molding. The piezoelements at the same time are, for example, applied into the mold and then further plastic is injected therearound. Accordingly, it is suitable to integrate an elastic mounting. Another variant lies in pressing and/or sintering the parts. Adhesive or mechanical connections, depending on the size of the drive likewise lead to success.

The resonators are advantageously designed as one piece and have a shape such that as a result of the mass distribution and arrangement one may excite suitable oscillation patterns and forms. By way of material selection, design and mounting, the oscillation patterns to be excited may be set dependent on the frequency. The design is selected such that depending on the excitation frequency one may excite different oscillation forms, permitting direction changes to be produced. The drive speed is preferably set via the amplitude of deflection. The inertia of the mass is exploited in a directed manner. By way of this it is possible, with a given excitation frequency, to operate at different drive speeds by variation of the amplitude. On driving the shaft, rotational speeds of a few to a few thousand rotations per minute are possible. By way of the selection of the mounting or suspension of the resonator relative to the body to be driven, one may set the pressing force, the holding moment and further variables. The resonator has an indirect or direct, active or passive interactive connection to the body to be driven. The mounting of the resonator with respect to the body to be driven compensates for wear and inaccuracies.

The movement of the oscillating parts of the drive according to the invention may be described simplified as follows: a longitudinal oscillation caused by an exciter in a resonator effects secondary oscillation modi (e.g. the transverse modi). The secondary or transverse oscillation modi sets in after a certain delay since, among other things, on account of the mass inertia and elasticity of the material it requires some time until the resonator moves into another oscillation mode. In other words, the speed of sound in a resonator and the bordering regions determines the delay time. By way of this (on transition from a longitudinal into a transverse oscillation mode by superposition) there is created an oscillation form similar to an ellipse. Dependent on location there are regions on the resonator that oscillate with a different "orientation", depending on the frequency and amplitude. If for example, corresponding regions are brought into interactive connection with a rotor, a force is transmitted onto this so that this begins to move accordingly. A drive according to the invention in a typical manner is operated with an excitation frequency of 50 kHz to 500 kHz depending on the size of the resonator and the speed of sound (with a suitable dimensioning other operating conditions are likewise possible).

Exciters may consist of any known piezoelectric materials including piezoelectric crystals, ceramics, plastics, etc. The oscillation bodies may consist of any material, such as metal, plastic, etc. The connection of the exciter or exciters to the oscillation bodies is effected via a known frictional fit, material fit, or positive fit means. With the knowledge of the present invention varied possibilities of connecting the exciter to the oscillation bodies are available to those skilled in the art. For example, exciters of ceramic with oscillation bodies of metal are attached with component adhesive.

With certain embodiments a ratio of length to width of the exciter equal to two or a multiple thereof is advantageous. A ratio of length to width equal to 2n(n=1, 2, 3, ... ) leads to particularly high amplitudes in the exciter.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
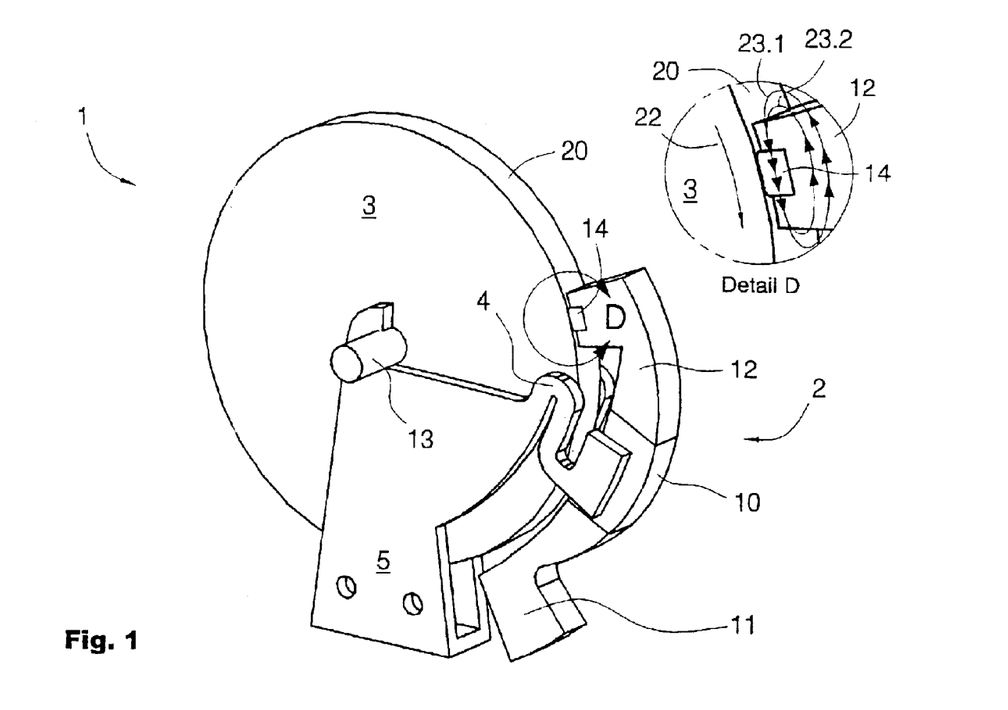
FIG. 1 is a perspective view of a first embodiment of a piezoelectric drive with a resonator and a contact location.

FIG. 1 schematically and greatly simplified shows a perspective view of a piezoelectric drive 1 with an essentially sickle-shaped resonator 2, with a round rotor 3, a spring element 4, and a holding device 5. The resonator 2 here consists of a piezoelement (excitation element) and two oscillation bodies 11, 12 attached to this on the end face. The resonator 2 is fastened on the holding device 5 by way of the spring element 4. The rotor 3 is rotatably mounted on the holding device 5 about the pivot 13. The resonator 2 is in interactive connection with a surface 20 of the rotor 3 by way of a contact element 14. The holding device 5 and the pivot 13 are here connected by snapping-in. Upon application of a suitable voltage to the piezoelement 10, the piezoelement 10 is displaced into oscillation, which is transmitted to the coupled oscillation bodies 11 and 12. By way of the special design and mounting of the resonator 2, the multi-dimensional oscillations excited by the piezoelement 10 superimpose such that the contact element 14 executes a cyclic drive movement, which is transmitted dependent on the frequency and amplitude onto the surface 20 of the rotor 3. The resonator 2 is designed such that the movement of the contact element extends essentially parallel to the surface to be driven, without damaging the surface. The form of the movement of the contact element is dependent on the configuration of the material properties (E-module, density, etc.), on the frequency and amplitude, and on the mounting, particularly mounting of the rotor 3. The rotor 3 influences the movement of the resonator 2. By way of this it is possible to find an optimal solution depending on the demands set. The dependency on the adjustable parameters extends so much that the direction of the drive may be varied in a directed manner. For example, by changing the frequency, the movement of the contact element 14 may be changed such that the rotational direction of the rotor 3 changes. The spring element 4 is formed such that it interactively takes part in the movement of the resonator 3. The mounting of the resonator 2 with respect to the rotor 3 is selected such that changes, such as any occurring abrasion and thermal expansions, are compensated. The mounting of the resonator may also be actively designed in a manner such that further influences may be exploited. In particular, the mounting is supported by way of damping, so that oscillation forms may be influenced in a directed manner.

The piezoelement 10 is excited by the spring elements 4 laterally attached on both sides in that an electrical voltage is applied. By way of this it begins to oscillate in a first oscillation in the direction of the oscillation bodies 11, 12 attached on the end face and, perpendicular to this, in a second oscillation and has the effect that the resonator 2 is displaced into characteristic oscillation. Simultaneously, secondary oscillations superimpose. The spring element 4, which is essentially s-shaped, is at the same time designed such that it behaves in a neutral manner with respect to the excited oscillation and supports transmission of this oscillation to the body to be driven. The spring element 4 is designed such that it has an increased flexibility at least in one direction so that the resonator may be moved in this direction in a preferred manner. The resonator 2 is essentially sickle-shaped and has mass concentrations at defined locations. The design of the resonator 2 (including the excitation element 10) effects the preferred drive movement.

The movement of the contact element is shown greatly simplified in detail D. The movement that sets in as a result of the multi-dimensional superimposing oscillations of the driving piezoelement 10, and by way of the design of the oscillation bodies 11 and 12, is indicated schematically by an arrow 23.1. The speed of the contact element 14 varies in dependence upon the location and the amplitude of the excitation oscillation. The speed is set by way of a change of the amplitude of the excitation oscillation. An oscillation which sets in as a result of a smaller amplitude is shown schematically by an arrow 23.2. The movement of the resonator about the pivot 13 is shown schematically by an arrow 20.

With the arrangement shown here the rotor 3 may be latched very simply. It is firmly held by the rotor 2 positioned over the spring element 4.

Figure 2:
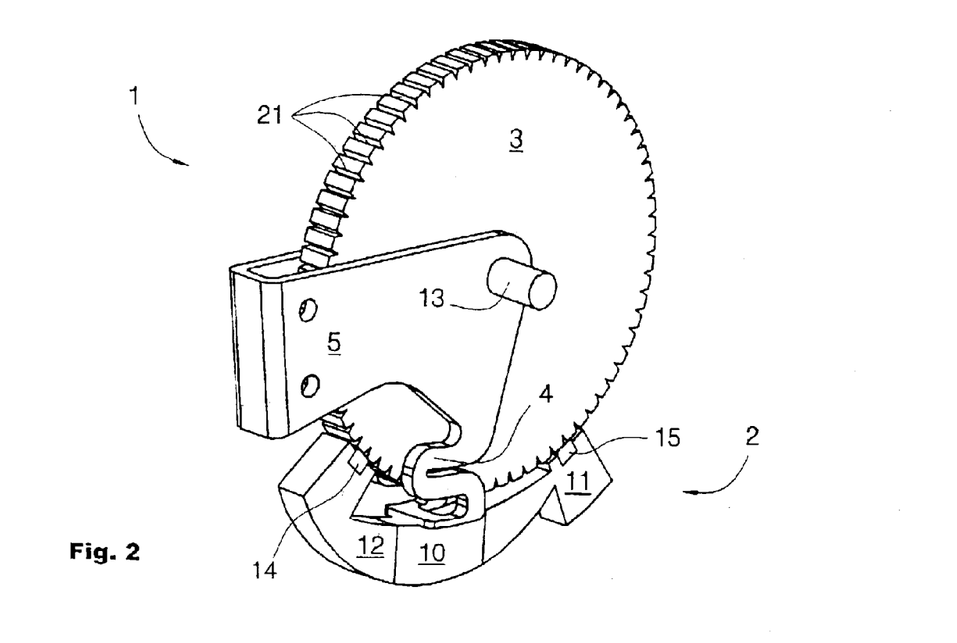
FIG. 2 is a perspective view of a second embodiment of a piezoelectric drive with a resonator and two contact locations.

FIG. 2 shows in a schematic and simplified manner a further embodiment of a drive 1. The individual parts corresponding to those of FIG. 1 will not be described in detail again. The arcuate resonator 2 apart from the piezoelectric element 10 comprises two t-shaped or I-shaped designed oscillation bodies 11, 12, which connect to the piezoelectric element 10 on the end face and each comprise one contact element 14, 15. These contact elements 14, 15 are in interactive connection with the surface 20 of the rotor 3. The spring element 4, which here is s-shaped, is attached on a side of the piezoelement 10 facing the rotor 3, as illustrated. The spring element 4 serves as an elastic mounting of the resonator 2 with respect to the holding device (chassis) 5, and serves for transmitting the reaction forces that arise on account of the drive movement transmitted onto the resonator 2. The spring element 4 is designed to ensure the interactive connection between the contact elements 14, 15 and the rotor 3. The spring element 4 has an increased spring force.

The excitation of the piezoelement 10 with a supply voltage is here effected via separate connections (not shown in more detail). The piezoelement 10 by way of this begins to oscillate in the direction of the oscillation bodies 11, 12 attached at the end face, and in a direction perpendicular to this.

The rotor 3 comprises elements along its circumference, here in the form of distanced deepenings or grooves 21. These elements 21 permit the production of count impulses so that the position of the rotor may be determined. The grooves 21 are designed in a manner such that preferably in the resonator 2, for example in the piezoelectric element 10 a change of a measurable variable is created. With this it may be the case of an impedance change, which is detected externally and analyzed. In place of grooves, other means that would lead to an equivalent result are also conceivable (for example special shapes of the resonator). The positioning means or grooves 21 are designed such that they do not negatively inhibit the functioning manner of the drive and such that the position of a body may be determined by way of the change of one measurable variable, in particular impedance changes. The maximum driving torque may be determined by the dimensioning of the parts. If, for example, the diameter of the rotor 3 is increased, the driving torque increases. The holding torque may be set by way of the element 4 and via the friction. If required, additional elements for increasing the holding or driving torque are possible. The drive may for example also be coupled to a gear in order to meet special demands.

Figure 3:
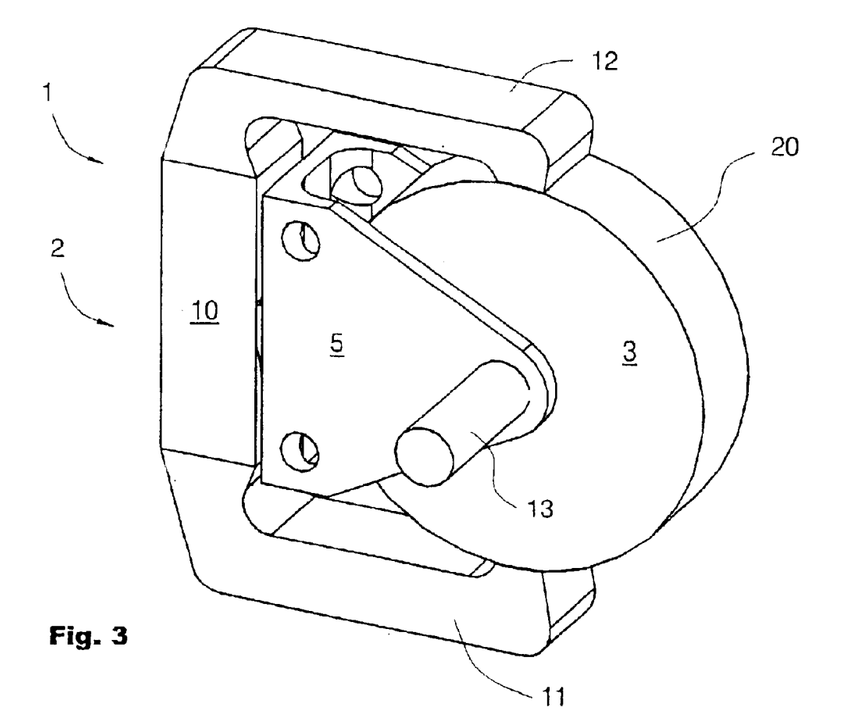
FIG. 3 is a perspective view of a third embodiment of a piezoelectric drive with a resonator and two contact locations.

FIG. 3 shows a further embodiment of the drive 1. The drive has an approximately u-shaped resonator 2 with two oscillation bodies 11, 12 that are connected to a piezoelement 10 on the end face. The oscillation bodies, which have different thickness, are in interactive connection with a side surface 20 of the rotor 3. More specifically, the oscillation bodies 11, 12 are in contact laterally to side surface 20 of the rotor, essentially tangentially. The resonator 2 is fastened on a holding device 5 such that its drive movement is not negatively impeded. One may influence the oscillation form of the resonator by way of the type and manner of the fastening. Depending on the applied type, the piezoelement 10 is excited either in the region of the end faces or at the free side surfaces, so that it begins to oscillate in the region in the direction of the oscillation bodies attached on the end face. On account of the design and arrangement of the resonator 2, the secondary movements superimpose, resulting in a directed drive movement.

The rotor 3 is rotatably mounted on the holding device 5 about a pivot 13. The shaft 13 in the illustrated embodiment is arranged in the center of the rotor 3. The number of oscillation bodies 11, 12 is not limited to two and is determined depending on the operational requirements. Other solutions deviating from the embodiments shown here, in which, for example, more than one rotor 3 is drivable, are also conceivable. One may also realize resonators 2 with more than one exciter and with more than two oscillation bodies. For example, the resonator 2 consists of a plurality of exciters or oscillation bodies 11, 12, which are present in a multilayer construction.

The oscillation bodies 11, 12 are designed such that they drive the rotor 3 in a frequency-dependent manner. The speed is determined advantageously via the amplitude. It is possible for one skilled in the art to find suitable solutions with the knowledge of the invention disclosed here. With other embodiments the pivot 13 may be arranged eccentrically with respect to the rotor 3 such that in the piezoelement 10 there is created a measurable change dependent on position. The shape of the rotor 3 in not necessarily circular, but it may, for example, be oval-shaped in order to create a suitable change. The piezoelement 10 may also have at its disposal more than one connection pair for exciting the oscillations. The parts here designed stationary may of course also be movably arranged. The same also applies to the movable parts: for example it is possible to integrate the resonators into a rotor or not to arrange these stationarily.

Figure 4:
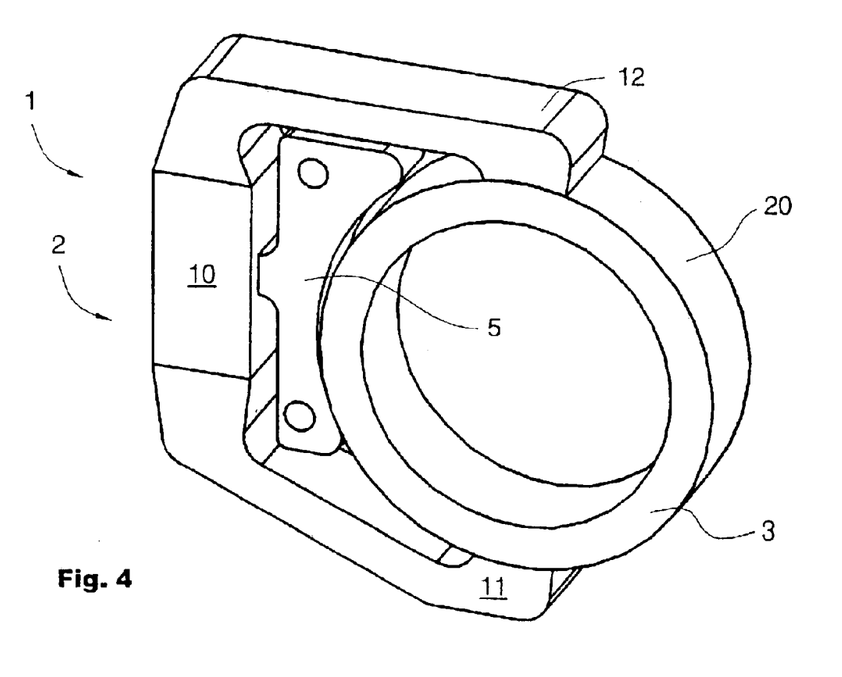
FIG. 4 is a perspective view of a fourth embodiment of a piezoelectric drive with a resonator and two contact locations.

FIG. 4 shows a further embodiment of the drive 1 schematically and greatly simplified. A rotor 3 is here designed as an annular hollow rotor and is mounted only by two differently long oscillation bodies 11, 12, which in the contact region run essentially tangentially to the rotor 3. The oscillation bodies 11, 12 are attached to two oppositely lying surfaces of a piezoelement 10 on the end face and together with this piezoelement form a u-shaped resonator 2. A holding device 5 is here interactively connected to the resonator 2 and serves as the resonator mounting. The oscillation bodies 11, 12 are designed to oscillate anti-cyclically as a result of a mechanical excitation by the piezoelement 10 and in combination with the rotor 3. The oscillation bodies 11, 12 have a certain pretension with respect to the rotor 3, by which means this is rotor is held and the drive movement is transmitted. Longitudinal oscillation components in the resonator 2 drive the rotor 3 tangentially, transverse components exert a holding and centering pressure on the rotor body. The rotor 3 is held by elastic means. Large holding forces are possible so that no further or external bearings are necessary for mounting. The conveyed torque may be very large since the step angle of the rotor body per oscillation is very small. For example, the step angle is 0.01°.

Figure 5:
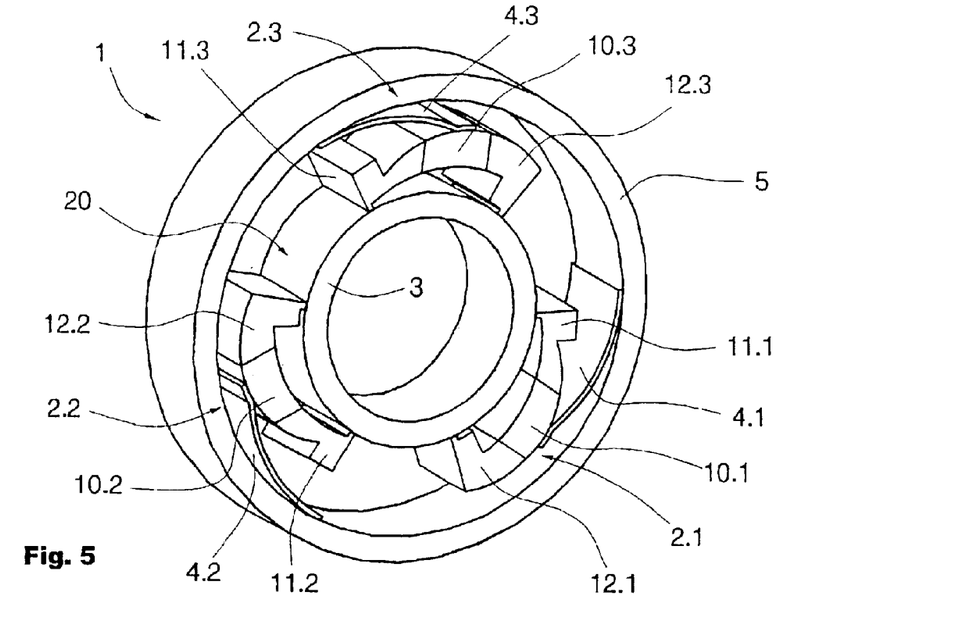
FIG. 5 is a perspective view of a fifth second embodiment of a piezoelectric drive with three resonators and six contact locations.

FIG. 5 schematically shows the drive 1 with three arcuate resonators 2.1, 2.2, 2.3. With this embodiment, which is essentially a parallel connection of three resonators according to FIG. 2, an increase in the drive power is achieved. Each of the three resonators 2.1, 2.2, 2.3 have one piezoelement 10.1, 10.2, 10.3 that is connected at the end face on two essentially parallel opposite sides to an oscillation element 11.1, 11.2, 11.3, 12.1, 12.2, 12.3. The oscillation elements are formed arcuate and I-shaped so that they have a mass distribution which leads to the desired oscillation behavior. With the three resonators, the illustrated embodiment includes three functionally dependent drives.

The resonators 10.1, 10.2, 10.3 are resiliently fastened to a holding device 5, which is annular, by way of spring elements 4.1, 4.2, 4.3. An annular rotor 3 is centrally mounted by the resonators 2.1, 2.2, 2.3. By way of an excitation the piezoelements 10.1, 10.2, 10.3 and the oscillation bodies interactively connected to them begin to oscillate in a multidimensional manner. These oscillations superimpose and are transmitted to the rotor 3, by is therefore set in motion. Play and abrasion are avoided on account of the compensatingly acting mounting by way of the spring elements 4.1, 4.2, 4.3. The spring elements 4.1, 4.2, 4.3 are designed in a manner such that they damp amongst other things negative oscillations or these negative oscillations do not have a negative effect on other components. By way of the elastic mounting of the rotor 3 shown here, the drive is particularly insensitive to impact loadings.

Figure 6:
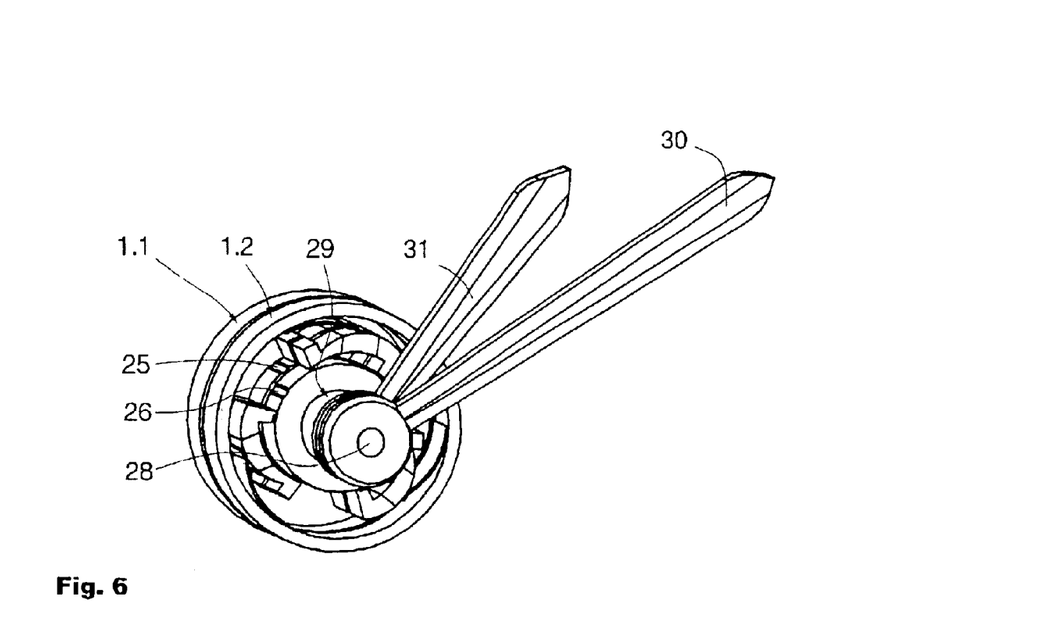
FIG. 6 is a perspective view of an embodiment of a piezoelectric drive for a clock with two hands.

FIG. 6 shows two drives 1.1, 1.2 produced according to the embodiment of FIG. 5 that are arranged behind one another. These two drives, for example, serve to drive two hands 30, 31 as they are employed in clocks, in particular wrist watches or other display apparatus. The first drive 1.1 has a pivot 28, which passes through the second drive 1.2 and serves for mounting the first hand 30. The second drive 31 has a pivot 29 designed corresponding through-going, which serves for mounting the second hand 31. By way of the arrangement shown here, two hands, as for example are present in watches, may be actuated independently. By way of the design of the drive one requires no gearing and no other mechanical parts. The hands are furthermore protected from knocks and other mechanical loading. The drives may be designed very small. On account of the flat construction it is possible to arrange them behind one another. Amongst one another they have no negative influence and malfunctioning. On account of the very high oscillation frequency the drive is practically noiseless. Two deepenings or grooves 25, 26 here serve as a positioning means of two rotors 3.2, 3.2. The grooves 25, 26 are designed to create a measurable change in one or all resonators 10.1, 10.2, 10.3, preferably in the behavior of the piezoelements 10.1, 10.2, 10.3. this may be measured externally and serves for positioning the hands 30, 31. In place of the grooves 25, 26 one may also use other positioning means. For example the shape of the resonators 3.1, 3.2 may be selected accordingly.

Figure 7:
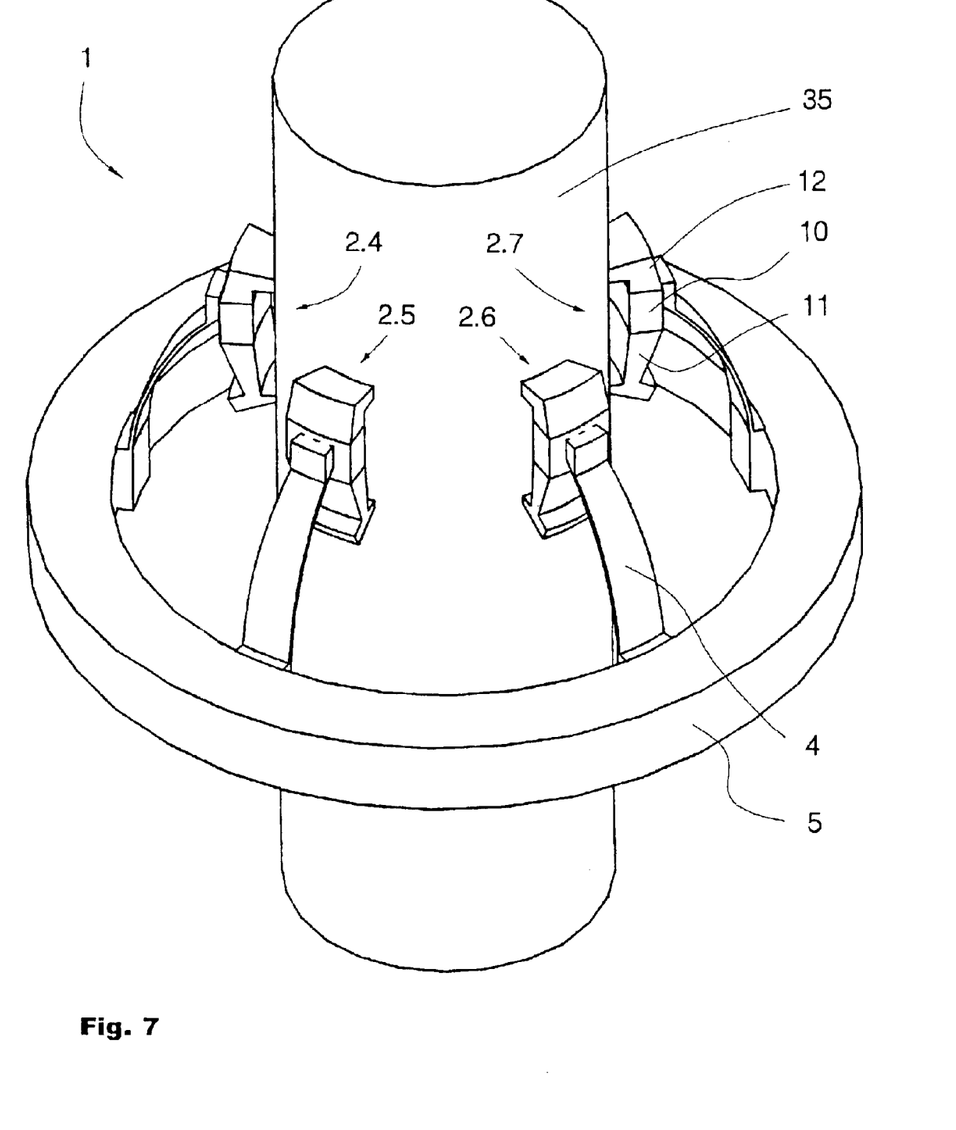
FIG. 7 illustrates an embodiment of a piezoelectric drive for a shaft.

FIG. 7 schematically shows a further embodiment of a drive 1. The drive 1 here acts on a shaft 35. Resonators 2.4, 2.5, 2.6, 2.7 are arranged around the shaft 35 and are in interactive connection with the shift 35. The resonators 2 are fastened on a holding device 5, which here is annular, by way of spring elements 4 and each have a piezoelement 10 with two coupled oscillation bodies 11, 12. The resonators 2 here are connected essentially parallel and would also function as functionally independent drives. An increase in the power is achieved by way of the parallel arrangement. By way of changing the excitation frequency one may influence the direction of the movement. The speed is controlled via the amplitude of the amplitude of the excitation frequency. By way of suitably arranged resonators (not shown in more detail) it is also possible, apart from an axial displacement, to also achieve a displacement in the circumferential direction. The number and arrangement of the resonators 2 is not fixed and may be optimized to meet the demands. When required, it is also useful to provide several resonators in a different direction so that one achieves direction independence.

Electrical connections for the supply voltage have not been drawn into the Figures for reasons of clarity and to provide a better overview. The resonators themeselves may form the electrical connections when using electrically conducting resonator elements. By applying an electrical alternating voltage a resonator is excited into mechanical oscillation. For example, a resonator is excited with a sinusoidal alternating voltage of 0.1 V and a frequency of 200 kHz. This permits the use of the resonator and exciters that, for example, are arranged in a multilayer construction in battery operated apparatus, such as clocks. On account of the inventive shaping of the resonator the mechanical oscillations in the resonator propagate differently. This leads to longitudinal as well as transverse oscillations that superimpose.

Figure 8:
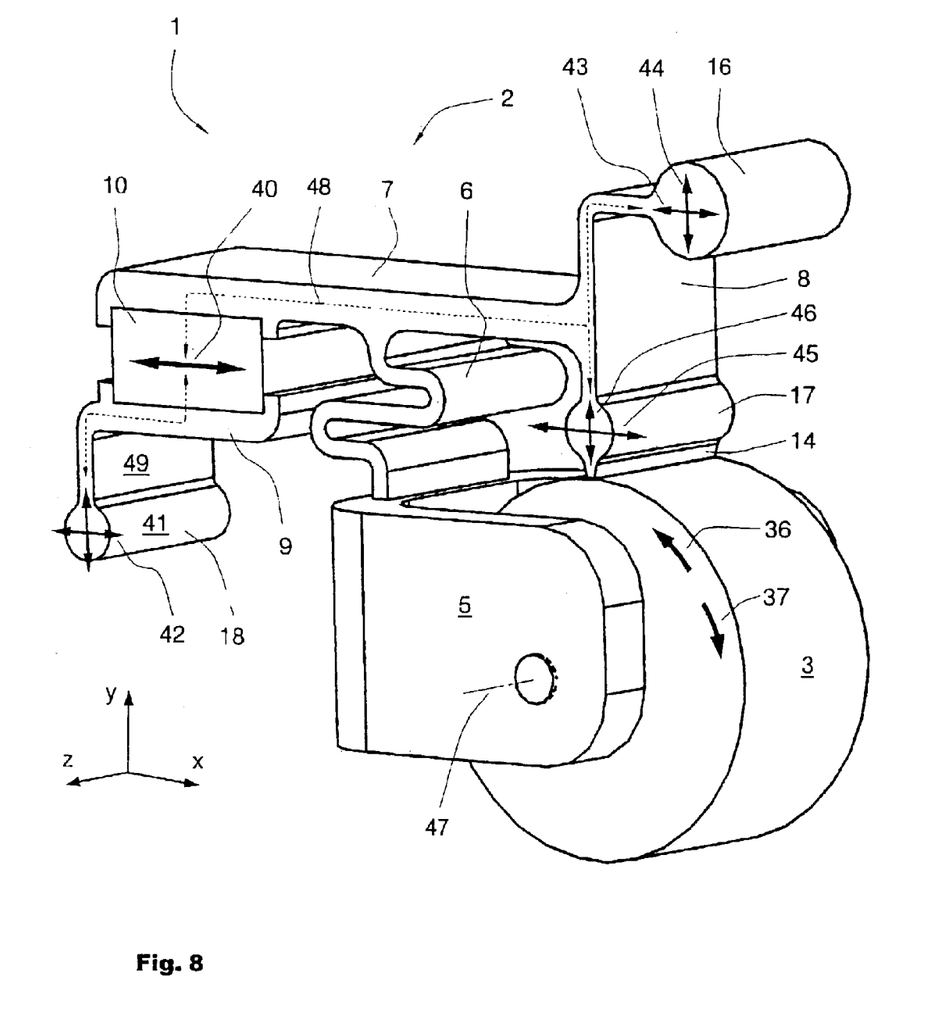
FIG. 8 schematically shows a piezoelectric drive.

FIG. 8 in a greatly simplified manner shows a schematic functional model of a piezomotor 1 according to the invention. The motor 1 shown here comprises a resonator 2 on which there is coupled a piezoelement 10. The piezoelement 10 serves as an exciter and is in interactive connection with the resonator 2, or is a part of the resonator. An elastic element 6, which here is in the form of a spring that is thin in one direction and curved several times, serves for mounting the resonator 2 with respect to the holding device 5. The elastic element 6 is designed to be preferably elastic with respect to movements parallel to an x/y-plane. Any occurring abrasion and play as well as undesired expansion are thus compensated. The resonator 2 has an asymmetrical mass distribution. For a better understanding this is made clear in a simplified manner by regions 10, 16, 17, 18 with mass concentrations (the piezoelement 10 here likewise represents a region with a mass concentration which influences the form of the excited oscillations). The regions with mass concentration 10, 16, 17, 18 are interactively connected via transition regions 7, 8, 9, whose mass and inertia are assumed to be negligible in this model. Here the transition regions 7, 8, 9 are formed more thickly in the z-direction and, due to this constructions, the resonator preferably moves in the x/y-plane.

The interactive connections that are shown schematically by arrows 48, 49, between the regions with mass concentrations 10, 16, 17, 18 are such that the movements of the regions with mass concentrations 10, 16, 17, 18 superimpose in a targeted manner and are influenced. The resonator here preferably oscillates in the x/y direction, as mentioned above. Secondary oscillations are possible. In particular the inertia of the masses, the elasticity of the material, the damping and the speed of sound play a significant role. The resonator 2 as a whole has preferred oscillation forms. The regions with mass concentration 10, 16, 17, 18 are arranged such that an oscillation that is excited in one direction has the result that an oscillation is excited in another direction. By way of this working principle one succeeds with one excitation element 10 that produces several drive directions. The direction of the excitation oscillation is exploited in a targeted manner in that the piezoelement is arranged according to its direction of preference. Furthermore, in its entirety one achieves the formation of characteristic (standing) forms of oscillation that may be changed and set in a targeted manner by way of the frequency and amplitude of the excitation. This driving movement is location-dependent and here, by way of a suitably arranged contact element 14, is transmitted onto a rotor 3 to be driven. The drive directions of the rotor are schematically shown by arrows 36, 37. The bearing element 6 is designed such that it supports the oscillation forms of the resonator 2 or at least does not negatively influence these. Play and abrasion are compensated with such an arrangement. The movements of the resonator 2, for the sake of simplicity, are limited to regions with mass concentrations and are shown schematically and greatly generalized by way of arrows 40, 41, 42, 43, 44, 45, and 46. Arrow 40 schematically represents the excitation oscillation. The resulting movement, which effectively sets in (superposition of the movements represented by the arrows 40, 41, 42, 43, 44, 45, 46) is determined by the design (in particular the mass distribution) of the resonator 2 and its mounting or damping. The driving movement of the resonator 2 is adjustable via the excitation frequency in a manner such that the drive direction may be changed. The resonator is designed such that, by way of an increase or reduction of the excitation frequency, another oscillation form may be set (in certain cases this may also be compared to standing waves) so that the drive movement of the contact element 14 changes. The interactive connection between the contact element 14 and the rotor 2 is selected such that the movement of the rotor is not negatively influenced. The resonator and the bordering parts are manufactured as one piece when required. As is shown in the above-described embodiments, it is possible to realize more than one driving contact point between the resonator 2 and the body to be driven. A suitably favorable design of the resonator 2 makes this possible. By way of a suitable selection of the mass distribution and interaction, several contact regions of the resonator 2 drive the rotor 3 in the same direction. The direction of the drive is determined by way of a suitable setting of the excitation frequency. By way of the amplitude of the excitation oscillation the speed may be set in a targeted manner. With the knowledge of the invention disclosed here it is possible for one skilled in the art to accordingly create other arrangements and designs of resonators.

Figure 9:
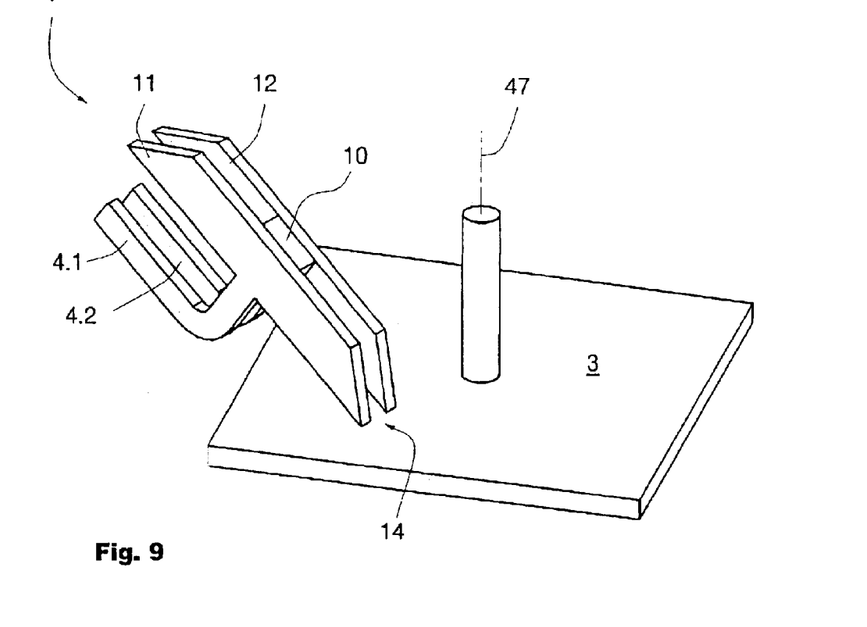
FIG. 9 illustrates a further embodiment of a piezoelectric drive.

FIG. 9 shows a further embodiment of a piezoelectric drive 1 in a very simplified and schematic manner. One may recognize a piezoelement 10 that is coupled between two flat oscillation bodies 11, 12 that in cross section are in the shape of a truncated pyramid. The oscillation bodies 11, 12 here are no longer attached on the piezoelement 10 on the end face, but rather laterally of the end face. The resonator 2 is mounted via spring elements 4.1, 4.2 (the other side of the mounting is not shown in more detail). The oscillation bodes here are in interactive connection with a rotor 3, which is rotatably mounted about a pivot 47. The two oscillation bodies 11, 12 are designed electrically conducting and serve the activation of the piezoelement 10. The oscillations of the piezoelement 10 in the longitudinal direction and perpendicular to the longitudinal direction are transmitted to the oscillation bodies 11, 12. The oscillation bodies influence and transform these movements and transmit them onto the rotor 3 such that the rotor rotates about the pivot 47. This drive is also suitable as a linear drive.

Figure 10:
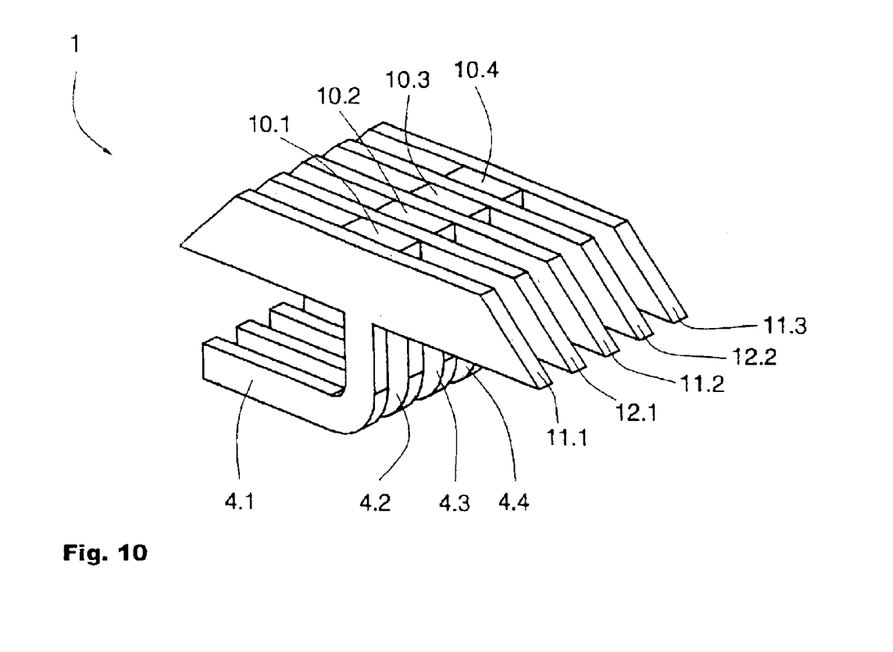
FIG. 10 illustrates a sandwich-like arrangement of the piezoelectric drive according to FIG. 9.

FIG. 10 shows a possible arrangement of oscillation bodies 11.1, 11.2, 11.3, 12.1, 12.2, and piezoelements 10.1, 10.2, 10.3, 10.4 according to FIG. 9. The oscillation bodies 11.1, 11.2, 11.3, 12.1, 12.2 and the piezoelements 10.1, 10.2, 10.3, 10.4 are here alternately arranged parallel and mutually support one another in their effect. By way of such an arrangement the transmitted forces are increased. With this connection in parallel, in contrast to the state of the art, as a rule no separate activation of each piezoelement is required. By way of this the motor may be operated with little expense.

What is claimed is:

1. A piezoelectric drive (1) comprising: a resonator (2) that includes an excitation piezoelement (10) and an oscillation body (11, 12), said oscillation body (11, 12) being coupled to the piezoelement and being in interactive connection with a body (3) to be driven, wherein the resonator (2) is mounted via mounting means (4, 6) attached to the resonator and acting elastically with respect to the body (3) to be driven, and has a mass distribution designed such that, as a result of an excitation oscillation by the piezoelement (10), and dependent on a frequency of the excitation oscillation, the resonator (2) oscillates asymmetrically in several directions (x, y, z), the asymmetric oscillations, via the interactive connection, displace the body (3) to be driven into a directed movement, and wherein the oscillation body (11, 12) is integrally formed with a spring element (4, 6) and may be brought into oscillation via the integrally formed spring element.

2. The piezoelectric drive (1) according to claim 1, wherein the spring element forms an electrical connection to the piezoelement.

3. The piezoelectric drive (1) according to claim 1, wherein the oscillation body (11, 12) is formed from a material selected from the group consisting of electrically conducting material, abrasion-resistant material, and thermally conducting material.

4. The piezoelectric drive (1) according to claim 1, wherein the resonator (2) has an asymmetrical shape and may be brought into oscillation in a longitudinal mode as well as in a transverse mode.

5. The piezoelectric drive (1) according to claim 1, wherein the piezoelectric drive (1) comprises only one piezoelement (10).

6. A piezoelectric drive (1) according to claim 1, wherein the piezoelectric drive (1) comprises a plurality of piezoelements (10.1, 10.2, 10.3) that are disposed parallel to each other and are connected together.

7. A piezoelectric drive (1) according to claim 1, wherein the mounting means (4, 6), with respect to a spring effect, is designed such that there is effected a reduction in the wear between the resonator and the drive.

8. The piezoelectric drive (1) according to claim 1, wherein the piezoelement (10) comprises side surfaces and at least one end face, said side surfaces being connected in an electrically conducting manner to the spring element (4) and said end face being in interactive connection with the oscillation body (11, 12), such that the piezoelement (10) is excited into oscillation in the direction of the end faces by way of applying an electrical voltage to the side surfaces, and the interactively connected oscillation body (11, 12) is excited into oscillation.

9. The piezoelectric drive (1) according to claim 1, wherein a speed of the driven body (3) may be set by an amplitude of the excitation piezoelement (10).

10. The piezoelectric drive (1) according to claim 1, wherein a direction of movement of the driven body (3) may be set by the frequency of the excitation piezoelement (10).

11. The piezoelectric drive (1) according to claim 1, wherein the resonator (2) has several interactive connections (14) with respect to the body (3) to be driven.

12. The piezoelectric drive (1) according to claim 1, wherein the body (3) to be driven is a rotor (3) or a linear drive.

13. The piezoelectric drive (1) according to claim 1, wherein a positioning means (24) produces a change of a measurable variable, said change in the measurable variable including a change in impedance and a change in phase, such that a position of a body (3) may be determined.

14. A method for driving a body, said method comprising the steps of:

displacing a piezoelectric element (10) of a resonator into a first and/or second oscillation, transmitting this first and/or second oscillation onto an interactively connected oscillation body (11, 12) of the resonator, elastically holding the resonator relative to a body to be driven using a spring element integrally formed with the oscillation body (11, 12) such that the oscillation body (11, 12) is displaced into a multidimensional oscillation, wherein in a certain zone of the oscillation body (11, 12) there is formed a characteristic movement, said characteristic movement including an elliptical movement, and wherein said characteristic movement is transmitted onto the body (3) to be driven so that said body is displaced into a directed movement, wherein the oscillation of the oscillation body (11, 12) is brought into oscillation via the integrally formed spring element, and whereby the holding of the oscillation body (11, 12) using the spring element reduces the wear on the body (3) to be driven and the oscillation body (11, 12).

15. The method according to claim 14, further comprising the step of setting a speed of the driven body (3) by setting an amplitude of the excitation piezoelement (10).

16. The method according to claim 14, further comprising the step of setting a direction of the movement of the driven body (3) by setting the frequency of the excitation piezoelement (10).

17. Use of the drive (2) according to claim 1, in a manner such that the drive, either in steps or continuously, sets parts in clocks, cameras, data memories, microscope tables or tachometers into movement.

18. A piezo electric drive comprising:

a rotor having a contact surface;

a resonator including a piezoelement connected to an oscillation body and operable to generate oscillations in the oscillation body, said oscillation body having a contact element;

a holding device that rotatably holds the rotor; and an elastic spring element connecting the resonator to the holding device, wherein the spring element conducts electrical voltage to the piezoelement; and wherein the construction of the resonator and the connection of the resonator to the holding device by the spring element is such that the oscillations of the oscillation body cause the contact element to move in an elliptical path, during which the contact element of the oscillation body contacts the contact surface of the rotor, thereby causing the rotor to rotate.

19. A piezo electric drive comprising:

a rotor having a contact surface;

a resonator including a piezoelement connected to an oscillation body and operable to generate oscillations in the oscillation body, said oscillation body having a contact element;

a holding device that rotatably holds the rotor; and an elastic spring element connecting the resonator to the holding device; and wherein the construction of the resonator and the connection of the resonator to the holding device by the spring element is such that the oscillations of the oscillation body cause the contact element to move in an elliptical path, during which the contact element of the oscillation body contacts the contact surface of the rotor, thereby causing the rotor to rotate;

wherein the resonator further comprises a second oscillation body, and wherein the piezoelement is connected between the oscillation body and the second oscillation body.

\* \* \* \* \*